United States Patent
Syracuse et al.

(10) Patent No.: US 6,930,468 B2
(45) Date of Patent: Aug. 16, 2005

(54) DISCHARGE METHODOLOGIES FOR OPTIMIZING THE PERFORMANCE OF LITHIUM/SILVER VANADIUM OXIDE CELLS

(75) Inventors: Kenneth Syracuse, Williamsville, NY (US); Noelle Waite, Clarence Center, NY (US); Hong Gan, East Amherst, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 29 days.

(21) Appl. No.: 10/658,731

(22) Filed: Sep. 9, 2003

(65) Prior Publication Data

US 2004/0051504 A1 Mar. 18, 2004

Related U.S. Application Data

(60) Provisional application No. 60/409,150, filed on Sep. 9, 2002.

(51) Int. Cl.$^7$ .................................................. H02J 7/00
(52) U.S. Cl. ........................ 320/136; 320/129; 320/132; 607/115
(58) Field of Search .................................. 320/127, 129, 320/132, 133–135, 136; 607/115–116, 5, 119

(56) References Cited

U.S. PATENT DOCUMENTS

| | | |
|---|---|---|
| 4,740,739 A | 4/1988 | Quammen et al. |
| 4,830,940 A | 5/1989 | Keister et al. |
| 4,964,877 A | 10/1990 | Keister et al. |
| 5,367,244 A | 11/1994 | Rose et al. |
| 5,435,874 A | 7/1995 | Takeuchi et al. |
| 5,571,640 A | 11/1996 | Takeuchi et al. |
| 5,598,085 A | 1/1997 | Hasler |
| 5,633,576 A | 5/1997 | Rose et al. |
| 5,739,672 A | 4/1998 | Lane |
| 5,801,515 A | 9/1998 | Chen et al. |
| 5,904,705 A | 5/1999 | Kroll et al. |
| 5,959,371 A | 9/1999 | Dooley et al. |
| 6,023,151 A | 2/2000 | Hudson et al. |
| 6,153,949 A | 11/2000 | Soderhall |
| 6,166,524 A | 12/2000 | Takeuchi et al. |
| 6,180,283 B1 | 1/2001 | Gan et al. |
| 6,274,269 B1 | 8/2001 | Gan et al. |
| 6,307,358 B1 | 10/2001 | Conrad |
| 6,826,427 B1 | 11/2004 | Fayram et al. |

*Primary Examiner*—Michael Sherry
*Assistant Examiner*—Robert Grant
(74) *Attorney, Agent, or Firm*—Michael F. Scalise

(57) ABSTRACT

It is known that reforming implantable defibrillator capacitors at least partially restores and preserves their charging efficiency. An industry-recognized standard is to reform implantable capacitors by pulse discharging the connected electrochemical cell about once every three months throughout the useful life of the medical device. A Li/SVO cell typically powers such devices. The present invention relates to methodologies for significantly minimizing, if not entirely eliminating, the occurrence of voltage delay and irreversible Rdc growth in the about 25% to 70% DOD region by subjecting Li/SVO cells to novel discharge regimes. At the same time, the connected capacitors in the cardiac defibrillator are reformed to maintain them at their rated breakdown voltages.

17 Claims, 4 Drawing Sheets

DISCHARGE METHODOLOGIES FOR OPTIMIZING THE PERFORMANCE OF LITHIUM/SILVER VANADIUM OXIDE CELLS

CROSS-REFERENCE TO RELATED APPLICATION

This application claims priority based on provisional application Ser. No. 60/409,150, filed Sep. 9, 2002.

BACKGROUND OF INVENTION

1. Field of the Invention

The present invention generally relates to the conversion of chemical energy to electrical energy. More particularly, this invention relates to an alkali metal electrochemical cell having reduced voltage delay and reduced irreversible or permanent Rdc growth. A preferred couple is a lithium/silver vanadium oxide (Li/SVO) cell. In such cells, it is desirable to reduce voltage delay and irreversible Rdc growth at about 25% to 70% depth-of-discharge (DOD), where these phenomena typically occur.

2. Prior Art

Voltage delay is a phenomenon typically exhibited in a lithium/silver vanadium oxide cell that has been depleted of about 25% to 70% of its capacity and is subjected to high current pulse discharge applications. In other portions of the discharge curve for a Li/SVO cell, Rdc, which is caused by a passivation layer buildup on the anode surface, is substantially diminished, if not completely eliminated, by pulse discharging the cell to remove the passivation layer.

The voltage response of a cell that does not exhibit voltage delay during the application of a short duration pulse or pulse train has a distinct signature. In particular, the cell potential decreases throughout the application of the pulse until it reaches a minimum at the end of the pulse. FIG. 1 is a graph showing an illustrative discharge curve 10 as a typical or "ideal" waveform of a cell during the application of a series of pulses as a pulse train that does not exhibit voltage delay.

On the other hand, the voltage response of a cell that exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied. FIG. 2 is a graph showing an illustrative discharge curve 12 as the voltage waveform of a cell that exhibits both forms of voltage delay.

The initial drop in cell potential during the application of a short duration pulse reflects the resistance of the cell, i.e., the resistance due to the cathode, the cathode-electrolyte interphase, the anode, and the anode-electrolyte interphase. The formation of a passivating surface film is unavoidable for alkali metal, and in particular, lithium metal anodes due to their relatively low potential and high reactivity towards organic electrolytes. In the absence of voltage delay, the resistance due to passivated films on the anode and/or cathode is negligible. Thus, the ideal anode surface film should be electrically insulating and ionically conducting. While most alkali metal, and in particular, lithium electrochemical systems meet the first requirement, the second requirement is difficult to achieve. In the event of voltage delay, the resistance of these films is not negligible, and as a result, impedance builds up inside the cell due to this surface layer formation that often results in reduced discharge voltage and reduced cell capacity. In other words, the drop in potential between the background voltage and the lowest voltage under pulse discharge conditions, excluding voltage delay, is an indication of the conductivity of the cell, i.e., the conductivity of the cathode, anode, electrolyte, and surface films, while the gradual decrease in cell potential during the application of the pulse train is due to the polarization of the electrodes and electrolyte.

The anodes of electrolytic capacitors can develop microfractures after extended periods of non-use. It is known that reforming electrolytic capacitors at least partially restores and preserves their charging efficiency. An industry-recognized standard is to reform implantable capacitors by pulse discharging the connected electrochemical cell about once every three months throughout the useful life of the medical device. Pulse discharging also serves to break up and substantially dissipates the passivating surface film on the lithium anode. However, at about 25% DOD to about 70% DOD, this frequency of pulse discharging, while acceptable for capacitor reform, does not adequately reduce voltage delay and irreversible Rdc caused by the passivating surface film on the lithium anode below that which is acceptable.

Thus, the existence of voltage delay is an undesirable characteristic of Li/SVO cells subjected to current pulse discharge conditions in terms of its influence on devices such as medical devices including implantable pacemakers, cardiac defibrillators and automatic implantable cardioverter defibrillators. Depressed discharge voltages and voltage delay are undesirable because they may limit the effectiveness and even the proper functioning of both the cell and the associated electrically powered device under current pulse discharge conditions.

SUMMARY OF THE INVENTION

The basis for the present invention, therefore, is driven by the desire to substantially reduce, if not completely eliminate, voltage delay and irreversible Rdc growth in a Li/SVO cell while at the same time periodically reforming the connected capacitors to maintain them at their rated breakdown voltages. Methodologies for accomplishing this by subjecting Li/SVO cells to novel discharge regimes are described. Then, the time to charge a capacitor is improved in comparison to the industry standard of pulse discharging the cell about once every 90 days currently deemed acceptable for capacitor reform. This allows for more practical deliverable energy.

These and other objects of the present invention will become increasingly more apparent to those skilled in the art by reference to the following description and to the appended drawings.

DETAILED DESCRIPTION OF THE PREFERRED EMBODIMENTS

Figure 1:
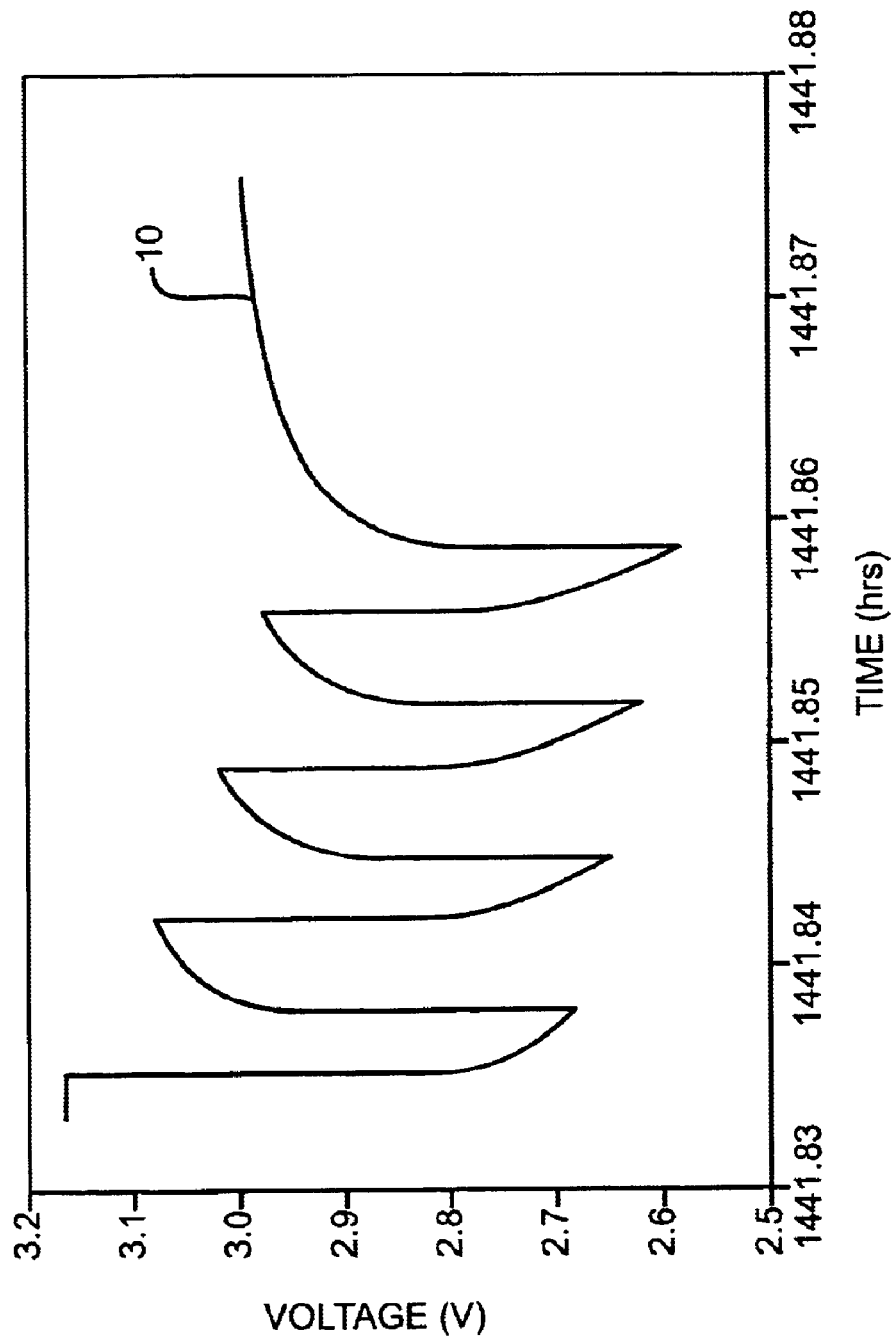
FIG. 1 is a graph showing an illustrative pulse discharge waveform or curve 10 of an exemplary electrochemical cell that does not exhibit voltage delay.

The term percent depth-of-discharge (% DOD) is defined as the ratio of delivered capacity to theoretical capacity, times 100.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses. An exemplary pulse train may consist of one to four 5 to 20-second pulses (23.2 mA/cm$^2$) with about a 10 to 30 second rest, preferably about 15 second rest, between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10 second pulse is suitable for medical implantable applications. However, it could be significantly shorter or longer depending on the specific cell design and chemistry and the associated device energy requirements. Current densities are based on square centimeters of the cathode electrode.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the counter electrode. The cathode is preferably of solid materials having the general formula SM$_x$V$_2$O$_y$ where SM is a metal selected from Groups IB to VIIB and VIII of the Periodic Table of Elements, and wherein x is about 0.30 to 2.0 and y is about 4.5 to 6.0 in the general formula. By way of illustration, and in no way intended to be limiting, one exemplary cathode active material comprises silver vanadium oxide having the general formula Ag$_x$V$_2$O$_y$, in either its β-phase having x=0.35 and y=5.8, γ-phase having x=0.74 and y=5.37, or ε-phase having x=1.0 and y=5.5, and combinations of phases thereof.

Before fabrication into an electrode for incorporation into an electrochemical cell according to the present invention, the cathode active material is preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 99 weight percent of the cathode active material.

Cathode components for incorporation into the cell may be prepared by rolling, spreading or pressing the cathode active mixture onto a suitable current collector selected from the group consisting of stainless steel, titanium, tantalum, platinum, nickel, and gold. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.), a membrane commercially available under the designation DEXIGLAS (C. H. Dexter, Div., Dexter Corp.), and a membrane commercially available under the designation TONEN.

The electrochemical cell of the present invention further includes a nonaqueous, ionically conductive electrolyte serving as a medium for migration of ions between the anode and the cathode electrodes during electrochemical reactions of the cell. The electrochemical reaction at the electrodes involves conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

An exemplary implantable medical device powered by a Li/SVO cell is a cardiac defibrillator, which requires a power source for a generally medium rate, constant resistance load component provided by circuits performing such functions as, for example, the heart sensing and pacing functions. This requires electrical current of about 1 microampere to about 100 milliamperes. From time-to-time, the cardiac defibrillator may require a generally high rate, pulse discharge load component that occurs, for example, during charging of a capacitor in the defibrillator for the purpose of delivering an electrical shock therapy to the heart to treat tachyarrhythmias, the irregular, rapid heartbeats that can be fatal if left uncorrected. This requires electrical current of about 1 ampere to about 5 amperes.

In order to test Li/SVO cells for their electrochemical characteristics, several accelerated discharge regimes are commonly used in the industry. One consists of discharging Li/SVO cells under a 17.4 kΩ load with superimposed pulse trains applied every 60 days. The pulse trains consist of four 2.0 amp, 10 second pulses with about 15 seconds rest between each pulse. One such pulse train is superimposed on the background load about every 2 months.

From extensive accelerated discharge modeling studies with Li/SVO cells, it has been discovered that such parameters as total discharge time to a. particular % DOD, cell current density ($mA/cm^2$), the number of pulses per pulse train, and the time between pulse trains (dT), among others, are believed to affect voltage delay and Rdc growth. In automatic implantable cardioverter defibrillator applications, one particularly important parameter is the charge time to achieve a pre-determined energy for therapy delivery. In other words, the time to charge a capacitor to a required voltage is affected by voltage delay and Rdc growth. An automatic implantable cardioverter defibrillator requires energy in the range of from about 40 Joules to about 70 Joules per Li/SVO cell for electrical shock therapy. The relationship is shown below:

$$Energy(J)=I(amp) \times V(volt) \times t(sec.)$$

$$t(s) = Energy\ (J)/IV$$

If the required delivered energy (J) and pulsing current (amp) are both defined, then the charge time in seconds is inversely proportional to the average voltage under pulsing. Therefore, to maintain a relatively low charge time, the cell must deliver higher voltage under pulsing. This requirement is, however, compromised by the voltage delay and Rdc growth phenomena in the Li/SVO system. As previously discussed, voltage delay and irreversible Rdc growth begin in a Li/SVO cell at about the middle of discharge life region (about 25% DOD) and continue to about 70% DOD. Under severe conditions, cell voltage under pulsing becomes so low that the charge time is considered too long for the required therapy. This results in shortened device longevity. Since voltage delay and Rdc growth start at about 25% to 40% DOD in a typical Li/SVO cell, it is possible that only up to about 40% of the theoretical capacity of a particular cell is actually delivered. The remaining capacity is wasted.

An automatic implantable cardioverter defibrillator essentially consists of an electrochemical cell as a power source for charging at least one electrolytic capacitor to deliver the electrical shock therapy to the patient's heart. Microprocessors powered by the cell perform the heart sensing and pacing functions and initiate capacitor charging to deliver the electrical shock therapy. Not only does the Li/SVO cell experience voltage delay and Rdc growth problems at about 25% DOD as explained above, but electrolytic capacitors can experience degradation in their charging efficiency after long periods of inactivity. It is believed that the anodes of electrolytic capacitors, which are typically of aluminum or tantalum, develop microfractures after extended periods of non-use. These microfractures consequently result in extended charge times and reduced breakdown voltages. Degraded charging efficiency ultimately requires the Li/SVO cell to progressively expend more and more energy to charge the capacitors for providing therapy.

To repair this degradation, microprocessors controlling the implantable medical device are programmed to regularly charge the electrolytic capacitors to or near a maximum-energy breakdown voltage (the voltage corresponding to maximum energy) before discharging them internally through a non-therapeutic load. The capacitors can be immediately discharged once the maximum-energy voltage is reached or they can be held at maximum-energy voltage for a period of time, which can be rather short, before being discharged. These periodic charge-discharge or charge-hold-discharge cycles for capacitor maintenance are called "reforms." Reforming implantable defibrillator capacitors at least partially restores and preserves their charging efficiency.

An industry-recognized standard is to reform implantable capacitors by pulse discharging the connected electrochemical cell about once every three months throughout the useful life of the medical device, which is typically dictated by the life of the cell. As previously discussed, it is generally recognized that a typical Li/SVO cell experiences voltage delay and irreversible Rdc growth in the about 25% to about 70% DOD region. The onset point is, however, dictated by whether the cathode is of a pressed powder design as described in U.S. Pat. Nos. 4,830,940 and 4,964,877, both to Keister et al. or of a freestanding sheet of SVO as described in U.S. Pat. Nos. 5,435,874 and 5,571,640, both to Takeuchi et al. These patents are assigned to the assignee of the present invention and incorporated herein by reference.

Nonetheless, the discharge life of a Li/SVO cell can be divided into three regions. For a pressed powder cathode, the first region ranges from beginning of life to about 35% DOD where voltage delay and irreversible Rdc growth are not significant. The second region ranges from about 35% DOD to about 70% DOD. The third region ranges from about 70% DOD to end of life and is where voltage delay and irreversible Rdc growth are significantly reduced, if not entirely absent again. On the other hand, for a freestanding sheet cathode, the first region ranges from beginning of life to about 25% DOD, the second region ranges from about 25% DOD to about 45% DOD and the third region ranges from about 45% DOD to end of life.

The exact beginning and end of the second region is determined by comparing a loaded voltage reading from a first cell pulse discharged at a relatively short time or baseline interval, for example every 30 days, with the corresponding loaded voltage reading from a second cell pulse discharged at a somewhat greater time interval. The baseline interval need not be 30 days, however, it is a dT such that there is no irreversible Rdc growth in comparison to a dT that results in cell polarization. This dT can be every 60 days to every 180 days, for example. Then, using linear interpolation to synchronize the curves at a predetermined DOD interval, when the difference between the loaded voltage reading for the first cell and the interpolated loaded voltage reading for the second cell is greater than about 3%, the calculated DOD constitutes the beginning of the second discharge region.

However, it is known that in some cell chemistries, and particularly those employing a freestanding sheet of SVO contacted to a current collector, there can be separation that fulfills this criterion during the first voltage plateau for a lithium cell. By way of background, a Li/SVO cell is known to have two voltage plateaus. The first occurs at about 3.2 volts and the second at about 2.6 volts. The discharge profile has a first sloping portion between the two plateaus and a second sloping portion from the end of the second plateau to end-of-life at about 2.0 volts. When separation between the corresponding loaded voltages for two comparative cells pulse discharged at different time intervals exceeds about 3%, but occurs during the first plateau instead of the first slope, it is reversible Rdc and does not signal commencement of the second discharge region.

As previously discussed, all that is required to eliminate the reversible Rdc anode passivation layer is to pulse discharge the cell. This serves to break up and dissipate the passivation layer, thereby eliminating the cause of the reversible Rdc. The problem is that in the second discharge region of a Li/SVO cell, more frequent pulse discharging never completely eliminates the voltage delay phenomenon. It merely lessens its severity to an acceptable amount. This is why the Rdc is termed irreversible.

The end of the second discharge region is determined by calculating when the derivative of the loaded voltage reading corresponding to that used to determine onset of this region is zero within 4% of DOD. Depending on the increment used, the derivative approaches zero in an 8% window, for example 58%±4% for a DOD increment of 2%.

Thus, the basis for the present invention is to precisely determine when the second discharge region constituting the onset of voltage delay and irreversible Rdc growth begins and ends. By delineating the boundaries of the second discharge region, it is known when to end and again begin periodically pulse discharging a Li/SVO cell about once every 90 days, as deemed necessary for capacitor reform by current industry standards, so that the cell can be pulsed more frequently than every 90 days in this precisely defined second region.

The following examples describe the manner and process of an electrochemical cell according to the present invention, and set forth the best mode contemplated by the inventors of carrying out the invention.

EXAMPLE I

In order to more clearly define the DOD point of initiation of voltage delay and irreversible Rdc at the beginning of the second discharge region, twelve similarly constructed Li/SVO cells commercially available from Wilson Greatbatch Technologies, Inc., Clarence, N.Y. under model no. 8830 were placed on test using the same background current, pulse amplitude, and number of pulses per train (4) with varying times between pulse trains or pulse intervals (dT). The cells contained cathodes of pressed SVO powder made as described in the above referenced Keister et al. patents. The cells were discharged at 37° C. under a 100-k$\Omega$ load with superimposed pulse trains. The pulse trains consisted of four 2.0 amp (23.25 MA/cm$^2$), 10-second pulses with 15 seconds rest between each pulse. The pulse trains were applied every about 30 days (cell group 1), about 60 days (cell group 2), about 120 days (cell group 3) and about 180 days (cell group 4). The discharge results are presented in FIG. 3. Each group contained three cells.

Figure 3:
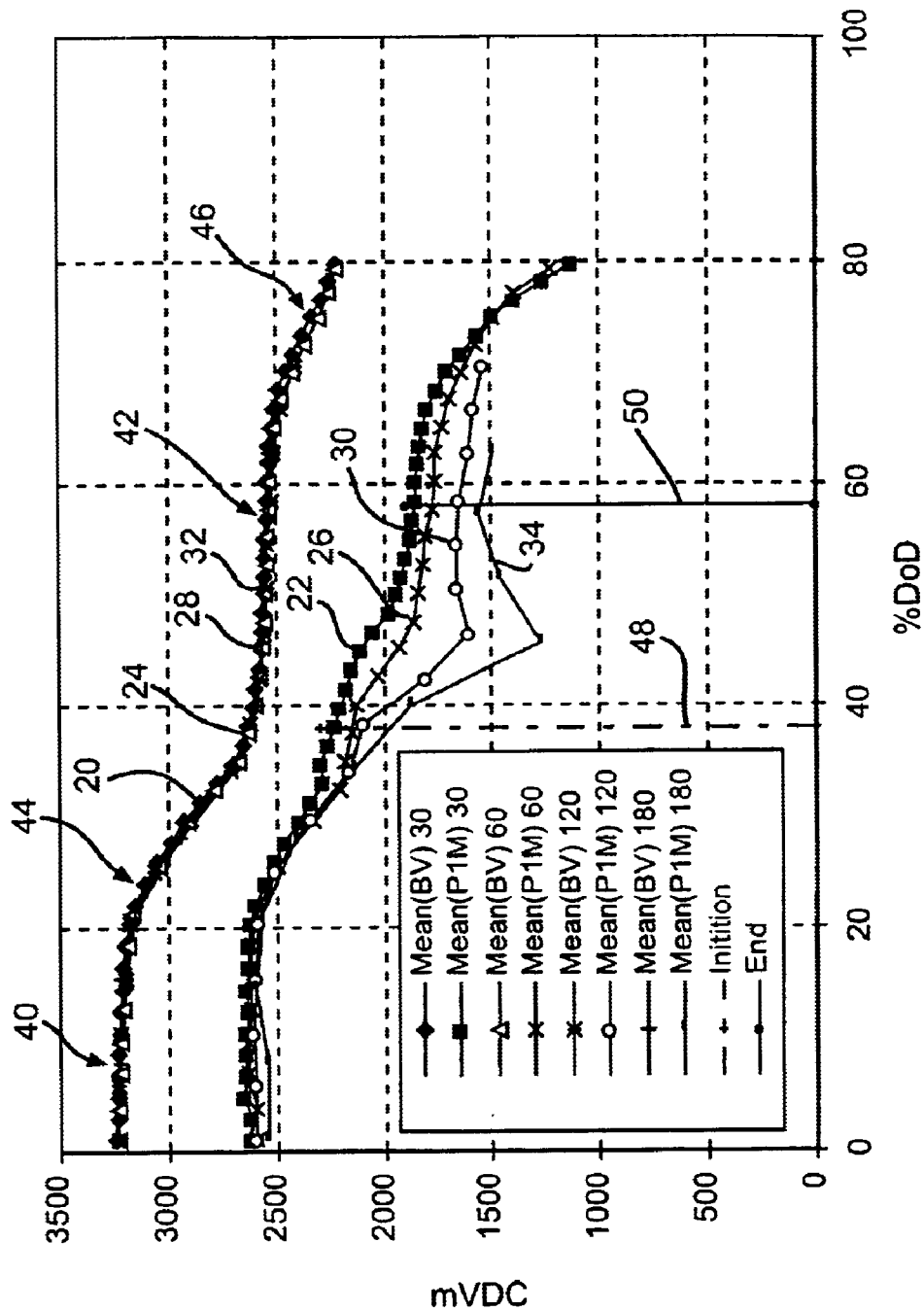
FIG. 3 is a graph constructed from the average discharge results of four groups of Li/SVO cells comprising pressed SVO powder cathodes pulse discharged using a similar pulse train with equal background current, but with varying intervals between trains.

In FIG. 3, curve 20 was constructed from the average background voltage of the cell group 1 and curve 22 was from the average pulse 1 minima of those cells. Curve 24 was constructed from the average background voltage of the cell group 2 and curve 26 was from the average pulse 1 minima of those cells. Curve 28 was constructed from the average background voltage of cell group 3 and curve 30 was from the average pulse 1 minima of those cells. Curve 32 was constructed from the average background voltage of the cell group 4 and curve 34 was from the average pulse 1 minima of those cells.

In FIG. 3, the background voltages 20, 24, 28 and 32 each have a first plateau, generally designated as 40, occurring at about 3.2 volts and a second plateau, generally designated as 42, at about 2.6 volts. There are two sloping discharge portions, generally designated as 44 and 46, associated with the plateaus.

Figure 2:
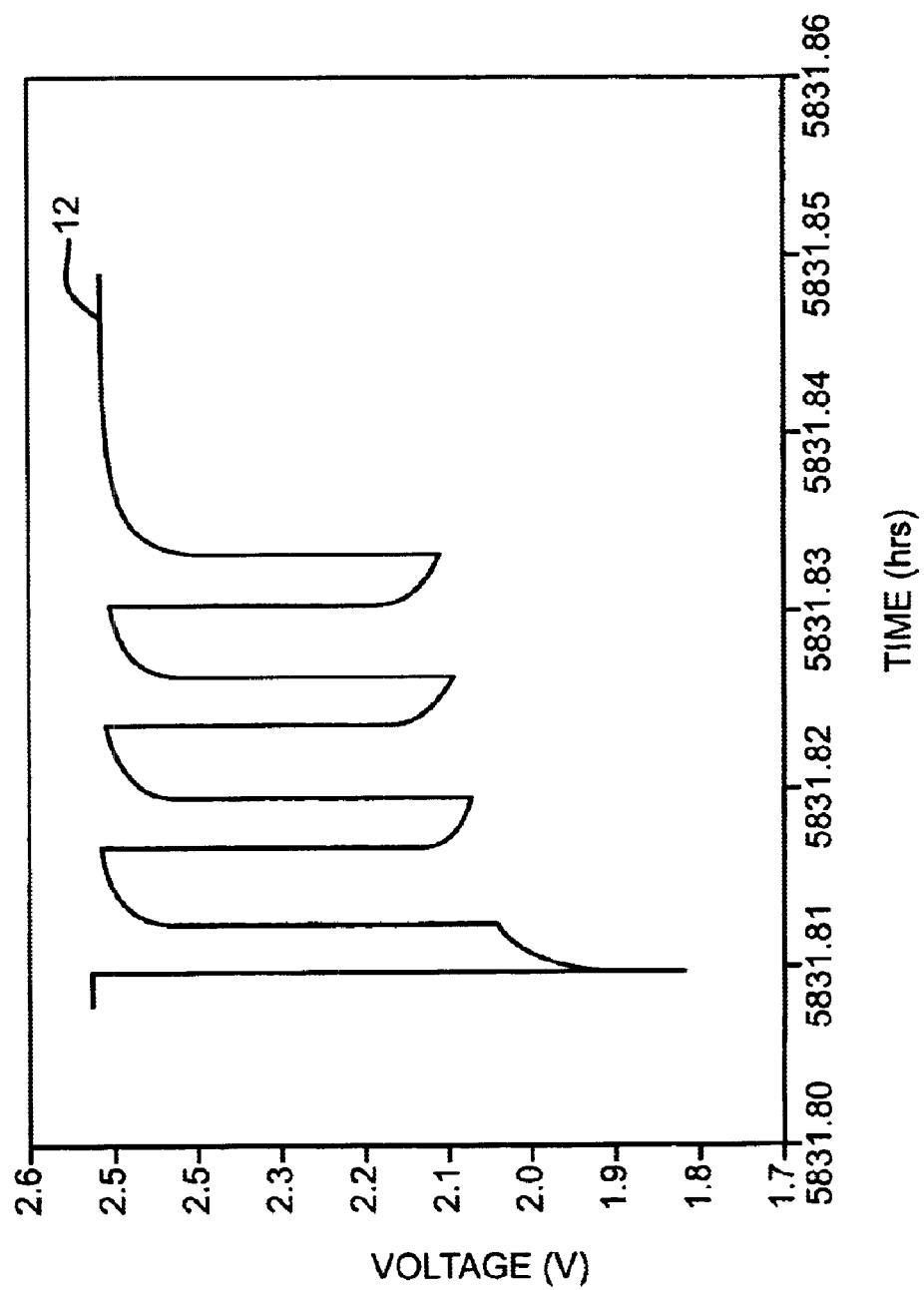
FIG. 2 is a graph showing an illustrative pulse discharge waveform or curve 12 of an exemplary electrochemical cell that exhibits voltage delay.

Voltage delay and irreversible Rdc growth are phenomena that manifest themselves when the loaded voltage profiles for the various discharge protocols begin to show separation along the first sloping portion 44 of the various discharge curves 20, 24, 28 and 32. The exact point of initiation of voltage delay and irreversible Rdc growth is determined to be where the difference between the loaded voltage (typically the first pulse minimum voltage) for a pulse train of the cell group 1 (dT=30 days) serving as an Rdc baseline and the interpolated loaded voltage for a pulse train of another cell group administered at least about every 6 weeks is at least 3% of the baseline voltage. Any two points on the pulse discharge waveforms for the comparative cell groups can be used as long as they coincide from one waveform to the other. Again, exemplary pulse discharge waveforms are shown in previously described FIGS. 1 and 2.

In that respect, the average pulse 1 minima voltage of curve 22 (dT=30 days) was compared to the average pulse 1 minima voltages of curve 26 (dT=60 days), curve 30 (dT=120 days) and curve 34 (dT=180 days). When any one of the differences is at least 3%, the calculated DOD is determined to constitute the beginning of the second discharge region. As shown in Table 1, for the Li/SVO cells containing a pressed SVO powder cathode, the beginning of the second discharge region was determined to be about 38% DOD, as indicated by line 48 in FIG. 3. The readings in Table 1 are from the data points used to construct FIG. 3. Up until initiation of irreversible Rdc growth at the end of the first discharge region beginning at background voltages greater than or equal to about 2,622 mV (average) or about 38% DOD, there is no need to discharge the Li/SVO cell in any different manner than is currently practiced to reform the associated capacitors.

TABLE 1

| | | dT = 30 | dT = 60 | dT = 120 | dT = 180 |
|---|---|---|---|---|---|
| Initiation | DoD | 38 | 38 | 38 | 38 |
| | BV (100 kOhm) | 2607 | 2628 | 2628 | 2624 |
| | mVDC | 2238 | 2153 | 2105 | 1969 |
| | | | 3.8% | 5.9% | 12.0% |
| End | DoD | 58 | 58 | 58 | 58 |
| | BV (100 kOhm) | 2571 | 2534 | 2525 | 2530 |
| | mVDC | 1858 | 1776 | 1647 | 1552 |

The second discharge zone extends from this initiation point to the DOD at which the first derivative of the loaded voltage curve used as the comparison to the baseline for determining initiation of the second region is within ±4% of zero. For this test, the end of the second discharge region occurred at about 2,540 mV (average) or about 58% DOD, as indicated by line 50 in the graph of FIG. 3. This means that at about 58% DOD it is again acceptable to pulse discharge a Li/SVO cell containing a pressed SVO powder cathode about once every three months or every 90 days to deliver constant energy pulses of a fixed magnitude until the end of the useful discharge life of the cell, as is generally accepted for reforming the associated capacitors in the implantable device. This discharge protocol is the same as is used in the first discharge region described above for capacitor maintenance.

EXAMPLE II

A second test was conducted on model no. 9610 cells commercially available from Wilson Greatbatch Technologies, Inc. This test was similar to that performed in Example I except that the cells contained cathodes of freestanding SVO sheets made as described in the above referenced Takeuchi et al. patents. The cells were discharged at 37° C. under a 100-kΩ load with superimposed pulse trains. The pulse trains consisted of four 1.74 amps (23.19 mA/cm$^2$), 10-second pulses with 15 seconds rest between each pulse. The pulse trains were applied every about 30 days (cell group 5), about 60 days (cell group 6), about 120 days (cell group 7) and about 180 days (cell group 8). The discharge results are presented in FIG. 4. Each group contained three cells.

Figure 4:
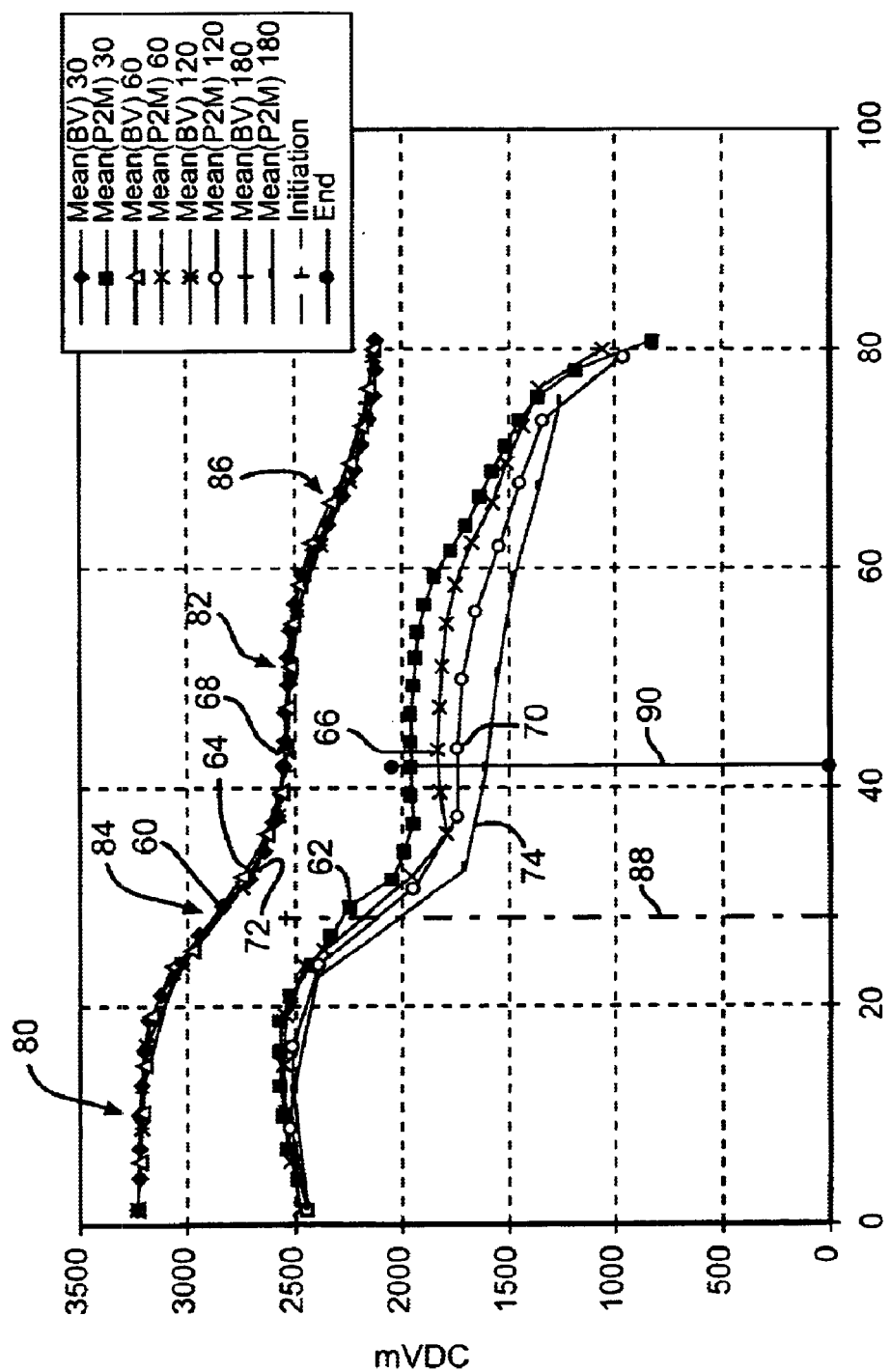
FIG. 4 is a graph constructed from the average discharge results of four groups of Li/SVO cells comprising freestanding SVO sheet cathodes pulse discharged in a similar manner as used to generate FIG. 3.

In FIG. 4, curve 60 was constructed from the average background voltage of the cell group 5 and curve 62 was from the average pulse 2 minima of those cells. Curve 64 was constructed from the average background voltage of the cell group 6 and curve 66 was from the average pulse 2 minima of those cells. Curve 68 was constructed from the average background voltage of cell group 7 and curve 70 was from the average pulse 2 minima of those cells. Curve 72 was constructed from the average background voltage of the cell group 8 and curve 74 was from the average pulse 2 minima of those cells.

In FIG. 4, the background voltages 60, 64, 68 and 72 each have a first plateau, generally designated as 80, occurring at about 3.2 volts and a second plateau, generally designated as 82, at about 2.6 volts. There are two sloping discharge portions, generally designated as 84 and 86, associated with the plateaus.

As shown in Table 2, loaded voltage separation delineating the beginning of the second discharge region occurs along the sloping portion 84 of the various discharge curves 60, 64, 68 and 72 at about 2,871 mV (average) or about 28% DOD, as indicated by line 88 in FIG. 4. The second region extends to about 2555 mV (average) or about 42% DOD, as indicated by line 90. The readings in Table 2 are from the data points used to construct FIG. 4.

TABLE 2

| | | dT = 30 | dT = 60 | dT = 120 | dT = 180 |
|---|---|---|---|---|---|
| Initiation | DoD | 28 | 28 | 28 | 28 |
| | BV (100 kOhm) | 2883 | 2882 | 2858 | 2863 |
| | mVDC | 2289 | 2195 | 2129 | 2021 |
| | | | 4.1% | 7.3% | 12.6% |
| End | DoD | 42 | 42 | 42 | 42 |
| | BV (100 kOhm) | 2558 | 2558 | 2555 | 2551 |
| | mVDC | 1961 | 1832 | 1742 | 1599 |

Thus, an aspect of the present invention is to pulse discharge a Li/SVO cell in the second discharge region more frequently than about once every 90 days, regardless of whether the cathode is of a freestanding SVO sheet or of pressed SVO powder. At the very minimum, the Li/SVO cell is discharged to deliver a pulse train at least about once every eight weeks, and up to as frequently as about once every one day. Current pulsing preferably consists of periodic pulse trains of one to four 10-second 2 to 3 amp pulses (15 mA/cm$^2$ to 40 mA/cm$^2$). If there is more than one pulse in a train, the pulses are separated from each other by a 15 seconds rest. More preferably, the cell delivers a pulse train about once every four weeks in the second discharge region.

In this manner, the region of severe voltage delay and irreversible Rdc growth is mitigated. In the remaining first and third discharge regions, cell irreversible Rdc does not grow significantly, which, in turn, translates into higher pulse voltages and shorter charge times. The current pulses can either be delivered to the device being powered by the cell or to a secondary "dummy" circuit.

It is appreciated that various modifications to the present inventive concepts described herein may be apparent to those of ordinary skill in the art without departing from the spirit and scope of the present invention as defined by the herein appended claims.

What is claimed is:

1. A method for powering an implantable medical device with a first electrochemical cell, the first cell comprising an alkali metal anode coupled to a cathode of a cathode active material activated with an electrolyte, comprising the steps of:

a) discharging a second cell of a similar chemistry as the first cell to deliver a first pulse discharge of electrical current of significantly greater amplitude than that of a pre-pulse current or open circuit voltage immediately prior to the first pulse discharge;

b) waiting a first time interval;

c) discharging the second cell to deliver a second pulse discharge of electrical current of significantly greater amplitude than that of a pre-pulse current or open circuit voltage immediately prior to the second pulse discharge;

d) deriving a first discharge curve from the first and second pulse discharges;

e) discharging a third cell of a similar chemistry as the first cell to deliver a third pulse discharge of electrical current of significantly greater amplitude than that of a pre-pulse current or open circuit voltage immediately prior to the third pulse discharge;

f) waiting a second time interval greater than the first time interval;

g) discharging the third cell to deliver a fourth pulse discharge of electrical current of significantly greater amplitude than that of a pre-pulse current or open circuit voltage immediately prior to the fourth pulse discharge;

h) deriving a second discharge curve from the third and fourth pulse discharges;

i) taking a first voltage reading at a first predetermined point on the first discharge curve to determine a first loaded voltage reading;

j) synchronizing a first depth-of-discharge (DOD) of the first loaded voltage reading with the second discharge curve to determine a corresponding second DOD of the second loaded voltage reading of the third cell;

k) subtracting the second loaded voltage reading from the first loaded voltage reading and then dividing by the first loaded voltage reading to determine a percent change; and l) pulse discharging the first cell powering the implantable medical device at least about once every 90 days and then upon the percent change exceeding about 3% of the first loaded voltage reading, discharging the first cell to deliver periodic current pulse discharges of significantly greater amplitude than that of a pre-pulse current or open circuit voltage immediately prior to the periodic current pulse discharges at intervals less than 90 days.

2. The method of claim 1 wherein the periodic current pulse discharges from the first cell are delivered at time intervals of from about one day to about eight weeks.

3. The method of claim 1 including discharging the first cell to deliver the periodic current pulse discharges to the implantable medical device or to a secondary load.

4. The method of claim 1 including discharging the first, second and third cells to deliver one current pulse as their current pulse discharges.

5. The method of claim 1 including discharging the first, second and third cells to deliver at least two current pulses spaced apart from about 10 to about 30 seconds as their current pulse discharges.

6. The method of claim 1 including discharging the first, second and third cells to deliver about 15 mA/cm$^2$ to about 50 mA/cm$^2$ as their current pulse discharges.

7. The method of claim 1 including discharging the first, second and third cells to deliver four current pulses as their current pulse discharges.

8. The method of claim 1 including continuing to pulse discharge the third cell at the second time interval until the derivative of the loaded voltage for the third cell is zero ±4% of DOD at which time the first cell powering the implantable medical device is again pulse discharged at least about once every 90 days.

9. The method of claim 1 including providing the first, second and third cells of a lithium/silver vanadium oxide couple.

10. The method of claim 9 wherein the cathode active material of the first, second and third cells are of silver vanadium oxide in either a freestanding sheet form or pressed powders form.

11. The method of claim 1 wherein the implantable medical device is selected from the group consisting of an implantable pacemaker, a cardiac defibrillators and an automatic implantable cardioverter defibrillators.

12. A method for powering an implantable medical device with a first electrochemical cell, the first cell comprising an alkali metal anode coupled to a cathode of a cathode active material activated with an electrolyte, comprising the steps of:

a) discharging a second cell of a similar chemistry as the first cell to deliver a first pulse discharge of electrical current of significantly greater amplitude than that of a pre-pulse current or open circuit voltage immediately prior to the first pulse discharge;

b) waiting a first time interval;

c) discharging the second cell to deliver a second pulse discharge of electrical current of significantly greater amplitude than that of a pre-pulse current or open circuit voltage immediately prior to the second pulse discharge;

d) deriving a first discharge curve from the first and second pulse discharges;

e) discharging a third cell of a similar chemistry as the first cell to deliver a third pulse discharge of electrical current of significantly greater amplitude than that of a pre-pulse current or open circuit voltage immediately prior to the third pulse discharge;

f) waiting a second time interval greater than the first time interval;

g) discharging the third cell to deliver a fourth pulse discharge of electrical current of significantly greater amplitude than that of a pre-pulse current or open circuit voltage immediately prior to the second pulse discharge;

h) deriving a second discharge curve from the third and fourth pulse discharges;

i) taking a first voltage reading at a first predetermined point on the first discharge curve to determine a first loaded voltage reading;

j) synchronizing a first depth-of-discharge (DOD) of the first loaded voltage reading with the second discharge curve to determine a corresponding second DOD of the second loaded voltage reading of the third cell;

k) subtracting the second loaded voltage reading from the first loaded voltage reading and then dividing by the first loaded voltage reading to determine a percent change;

l) pulse discharging the first cell powering the implantable medical device at least about once every 90 days and then upon the percent change exceeding about 3% of the first loaded voltage reading, discharging the first cell to deliver periodic current pulse discharges of significantly greater amplitude than that of a pre-pulse current or open circuit voltage immediately prior to the periodic current pulse discharges at intervals less than 90 days; and m) continuing to pulse discharge the third cell at the second time interval until the derivative of the loaded voltage for the third cell is zero ±4% of DOD at which time the first cell powering the implantable medical device is again pulse discharged at least about once every 90 days.

13. The method of claim 12 including providing the first, second and third cells of a lithium/silver vanadium oxide couple.

14. The method of claim 13 wherein the cathode active materials of the first, second and third cells are of silver vanadium oxide in a pressed powders form.

15. The method of claim 14 wherein the first cell is pulse discharged at intervals of less than 90 days from about 38% DOD to about 58% DOD.

16. The method of claim 13 wherein the cathode active materials of the first, second and third cells are of silver vanadium oxide in a freestanding sheet form.

17. The method of claim 16 wherein the first cell is pulse discharged at intervals of less than 90 days from about 28% DOD to about 42% DOD.

* * * * *